United States Patent
Kotani et al.

(10) Patent No.: US 11,581,129 B2
(45) Date of Patent: Feb. 14, 2023

(54) REACTOR AND POWER SUPPLY CIRCUIT

(71) Applicant: Panasonic Intellectual Property Management Co., Ltd., Osaka (JP)

(72) Inventors: Junichi Kotani, Hyogo (JP); Hisayoshi Kato, Osaka (JP); Takayuki Hiruma, Osaka (JP); Osamu Moriya, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 559 days.

(21) Appl. No.: 16/496,374

(22) PCT Filed: Mar. 15, 2018

(86) PCT No.: PCT/JP2018/010120
§ 371 (c)(1),
(2) Date: Sep. 20, 2019

(87) PCT Pub. No.: WO2018/173900
PCT Pub. Date: Sep. 27, 2018

(65) Prior Publication Data
US 2021/0110970 A1    Apr. 15, 2021

(30) Foreign Application Priority Data
Mar. 23, 2017 (JP) .............................. JP2017-058097

(51) Int. Cl.
*H01F 27/08* (2006.01)
*H01F 27/38* (2006.01)
(Continued)

(52) U.S. Cl.
CPC .............. *H01F 27/38* (2013.01); *H01F 3/10* (2013.01); *H01F 27/306* (2013.01); *H01F 30/06* (2013.01);
(Continued)

(58) Field of Classification Search
CPC .......... H01F 27/38; H01F 3/10; H01F 27/306; H01F 30/06; H01F 37/00; H02M 3/1584;
(Continued)

(56) References Cited

U.S. PATENT DOCUMENTS 5,525,951 A    6/1996   Sunano et al.
2009/0289751 A1  11/2009   Nagano et al.
(Continued)

FOREIGN PATENT DOCUMENTS

CN        103971894 A    8/2014
JP        H06-005448 A   1/1994
(Continued)

OTHER PUBLICATIONS

International Search Report issued in corresponding International Patent Application No. PCT/JP2018/010120, dated Jun. 5, 2018, with English translation.
(Continued)

*Primary Examiner* — Tuyen T Nguyen
(74) *Attorney, Agent, or Firm* — McDermott Will & Emery LLP

(57) ABSTRACT

A reactor includes a plurality of windings, a coupling core, and an inductor core. A coupling core configured to form a coupling closed magnetic circuit that magnetically couples the plurality of windings, the plurality of windings being wound around the coupling core; and. An inductor core, which includes a main part, a first projection part projecting from one end of the main part, and a second projection part projecting from another end of the main part, and each of the first projection part and the second projection part is magnetically connected to the coupling core. The inductor core forms an inductor closed magnetic circuit together with a part of the coupling core around which one winding of the plurality of windings is wound.

11 Claims, 5 Drawing Sheets

(51) Int. Cl.
- *H01F 3/10* (2006.01)
- *H01F 27/30* (2006.01)
- *H01F 30/06* (2006.01)
- *H02M 3/158* (2006.01)
- *H02M 3/335* (2006.01)
- *H02M 1/00* (2006.01)

(52) U.S. Cl.
CPC ........ *H02M 3/1584* (2013.01); *H02M 3/335* (2013.01); *H02M 1/0058* (2021.05)

(58) Field of Classification Search
CPC .. H02M 3/335; H02M 1/0058; H02M 1/0064; H02M 3/155; H02M 3/28; Y02B 70/10
See application file for complete search history.

(56) References Cited

U.S. PATENT DOCUMENTS

| | | |
|---|---|---|
| 2012/0056704 A1 | 3/2012 | Nagano et al. |
| 2012/0099348 A1* | 4/2012 | Umetani ............... H02M 3/158 363/37 |
| 2013/0301327 A1* | 11/2013 | Wagoner ............. H02M 7/5387 363/132 |

FOREIGN PATENT DOCUMENTS

| | | |
|---|---|---|
| JP | H06-007223 U | 1/1994 |
| JP | H11-144971 A | 5/1999 |
| JP | 2001-093737 A | 4/2001 |
| JP | 2009-284647 A | 12/2009 |
| JP | 2012-54484 A | 3/2012 |
| JP | 2012-110208 A | 6/2012 |
| JP | 2013-115298 A | 6/2013 |

OTHER PUBLICATIONS

Chinese Office Action dated Nov. 26, 2020 issued in corresponding Chinese Patent Application No. 201880019681.2, with English translation.

* cited by examiner

REACTOR AND POWER SUPPLY CIRCUIT

CROSS-REFERENCE OF RELATED APPLICATIONS

This application is the U.S. National Phase under 35 U.S.C. § 371 of International Patent Application No. PCT/JP2018/010120, filed on Mar. 15, 2018, which in turn claims the benefit of Japanese Application No. 2017-058097, filed on Mar. 23, 2017, the entire disclosures of which Applications are incorporated by reference herein.

TECHNICAL FIELD

The present disclosure relates generally to a reactor and a power supply circuit, and more particularly, to a reactor including a core, and a power supply circuit including the reactor.

BACKGROUND ART

In the related art, there is disclosed a composite transformer (reactor) including a single transformer and a plurality of inductors (see Patent Literature 1, for example).

The composite transformer according to Patent Literature 1 includes a plurality of windings, a transformer core, and a plurality of inductor cores. The transformer core includes a plurality of transformer-core legs, which extend in a direction of axes of the windings, and around which the windings are wound. The plurality of inductor cores include inductor-core legs, which extend in a direction of axes of the windings, and around which the windings are wound. Further, the plurality of inductor cores are arranged so that each of the inductor-core legs is adjacent to one of the transformer-core legs in a direction perpendicular to the direction of the axes of the windings. The plurality of windings are wound around core legs formed with the transformer-core legs and the inductor-core legs in such a manner that magnetic fluxes are produced in the transformer-core legs and the inductor-core legs when currents flow through the windings.

In order to prevent influence of a magnetic field produced in each of the transformer core and the inductor cores, the composite transformer according to Patent Literature 1 further includes a magnetic insulation sheet inserted between the transformer core and the inductor cores.

In the field of the reactor, further downsizing of the reactor is desired.

CITATION LIST

Patent Literature

Patent Literature 1: JP 2012-54484 A

SUMMARY OF INVENTION

The present disclosure has been made in view of the above-mentioned cause, and therefore has an object to provide a reactor capable of being downsized, and a power supply circuit including the reactor.

A reactor according to a first aspect of the present disclosure includes a plurality of windings, a coupling core, and an inductor core. The reactor, includes: the coupling core configured to form a coupling closed magnetic circuit that magnetically couples the plurality of windings, the plurality of windings being wound around the coupling core; the inductor core forming an inductor closed magnetic circuit together with a part of the coupling core around which one winding of the plurality of windings is wound.

The reactor according to a second aspect of the present disclosure, in the first aspect, includes a plurality of the inductor cores, and the number of the plurality of windings and the number of the plurality of the inductor cores are the same.

In the reactor according to a third aspect of the present disclosure, in the second aspect, each of the number of the plurality of windings and the number of the plurality of the inductor cores is two.

In the reactor according to a fourth aspect of the present disclosure, in the third aspect, the two windings have the same number of turns.

In the reactor according to a fifth aspect of the present disclosure, in any one of the first to fourth aspects, the coupling core has a magnetic permeability that is higher than a magnetic permeability of the inductor core.

In the reactor according to a sixth aspect of the present disclosure, in any one of the first to fifth aspects, the coupling core and the inductor core are formed of different materials. The inductor core has a saturation magnetic flux density that is higher than a saturation magnetic flux density of the coupling core.

A power supply circuit according to a seventh aspect of the present disclosure includes the reactor of any one of the first to sixth aspects, and a controller. The controller is configured to control electric currents flowing through the plurality of windings.

In the power supply circuit according to an eighth aspect of the present disclosure, in the seventh aspect, the controller shifts phases of ripple currents flowing through the plurality of windings, the phases of ripple currents shifted being different from each other.

DESCRIPTION OF EMBODIMENTS

Now, an embodiment of the present disclosure is described with reference to the drawings. It should be noted, however, that the embodiment to be described below is merely one of various embodiments of the present disclosure. Various modifications can be made to the following embodiment depending on design and other such factors as long as the object of the present disclosure can be achieved.

(1) Outline

Figure 1:
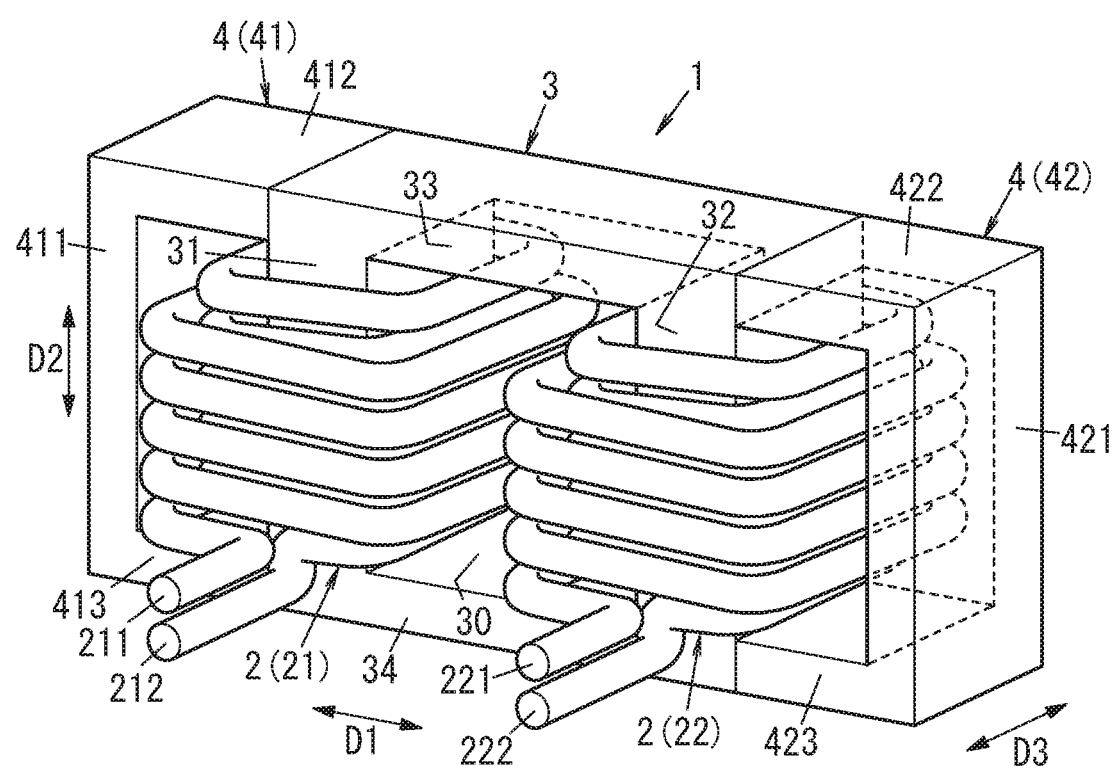
FIG. 1 is an external perspective view of a reactor according to an embodiment of the present disclosure.

An external perspective view of a reactor 1 according to this embodiment is illustrated in FIG. 1. The reactor 1 according to this embodiment includes a plurality of (in this embodiment, two) windings 2, a coupling core 3, and a plurality of (in this embodiment, two) inductor cores 4. When the two windings 2 are distinguished for description, one winding 2 is described as a "first winding 21", and the other winding 2 is described as a "second winding 22".

Further, when the two inductor cores 4 are distinguished for description, one inductor core 4 is described as a "first inductor core 41", and the other inductor core 4 is described as a "second inductor core 42".

The reactor 1 according to this embodiment is a two-phase magnetic coupling reactor, and has a magnetic coupling function of magnetically coupling the two windings 2, and an inductor function of storing magnetic energy.

The coupling core 3 is formed into a rectangular frame shape, and wound by the two windings 2. The coupling core 3 forms a closed magnetic circuit to magnetically couple the two windings 2. The inductor cores 4 have a one-on-one relationship with the windings 2. The inductor cores 4 are formed into a substantially C shape, and are arranged to form closed magnetic circuits with parts of the coupling core 3 around which the corresponding windings 2 are wound. The inductor cores 4 are configured to store, as magnetic energy, magnetic fluxes generated when electric currents are allowed to flow through the corresponding windings 2.

Figure 2:
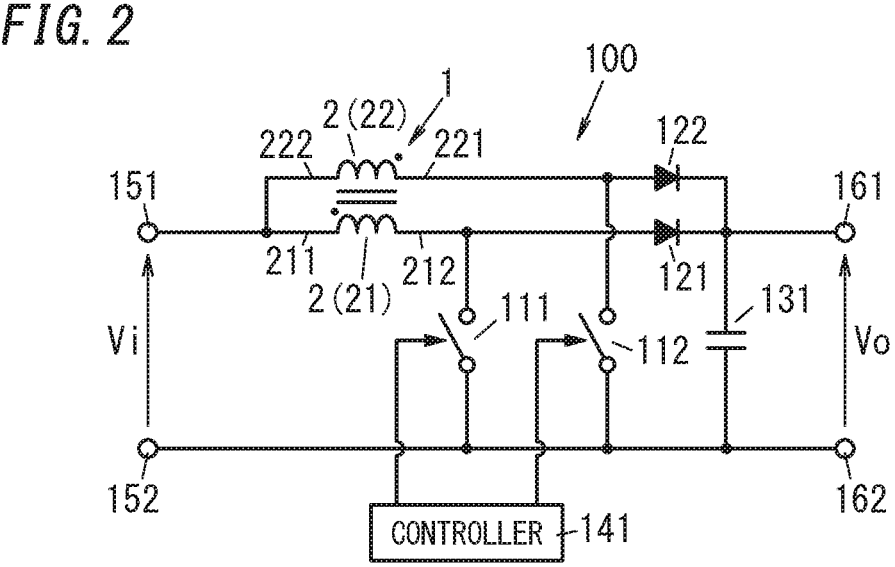
FIG. 2 is a circuit diagram of a power supply circuit including the above-mentioned reactor.

The reactor 1 in this embodiment is used in a power supply circuit 100 provided in a power conditioner for an automobile, a dwelling, or a non-dwelling, an electronic device, and the like, for example. In other words, the power supply circuit 100 according to this embodiment includes the reactor 1. A circuit diagram of the power supply circuit 100 according to this embodiment is illustrated in FIG. 2.

The power supply circuit 100 according to this embodiment is a multi-phase boost chopper circuit configured to boost and output an input voltage Vi. The power supply circuit 100 includes the reactor 1, two switching elements (first switching element 111 and second switching element 112), two diodes (first diode 121 and second diode 122), a capacitor 131, and a controller 141.

In the power supply circuit 100 according to this embodiment, a DC input voltage Vi is applied between a pair of input terminals 151 and 152. Between the pair of input terminals 151 and 152, a series circuit of the first winding 21 of the reactor 1 and the first switching element 111, and a series circuit of the second winding 22 of the reactor 1 and the second switching element 112 are electrically connected in parallel.

The first winding 21 and the second winding 22 are magnetically coupled to each other by the coupling core 3. Further, the first winding 21 and the second winding 22 are electrically connected to a high-potential side input terminal 151 so that winding directions thereof are opposite to each other.

Each of the first switching element 111 and the second switching element 112 is formed of a metal oxide semiconductor field effect transistor (MOSFET), for example. The first switching element 111 has one end electrically connected to the high-potential side input terminal 151 via the first winding 21, and the other end electrically connected to a low-potential side input terminal 152. The second switching element 112 has one end electrically connected to the high-potential side input terminal 151 via the second winding 22, and the other end electrically connected to the low-potential side input terminal 152. The first switching element 111 and the second switching element 112 are controlled to be turned on/off by the controller 141.

Between both ends of the first switching element 111, a series circuit of the first diode 121 and the capacitor 131 is electrically connected. Between both ends of the second switching element 112, a series circuit of the second diode 122 and the capacitor 131 is electrically connected. In other words, between both ends of the capacitor 131, a series circuit of the first switching element 111 and the first diode 121 and a series circuit of the second switching element 112 and the second diode 122 are electrically connected in parallel to each other.

The capacitor 131 is a smoothing capacitor, and is electrically connected between a pair of output terminals 161 and 162. The first diode 121 has an anode electrically connected to a node between the first winding 21 and the first switching element 111, and a cathode electrically connected to the capacitor 131. The second diode 122 has an anode electrically connected to a node between the second winding 22 and the second switching element 112, and a cathode electrically connected to the capacitor 131.

The controller 141 is configured to control the first switching element 111 and the second switching element 112 to turn the first switching element 111 and the second switching element 112 on/off directly or via a drive circuit. The controller 141 controls the first switching element 111 and the second switching element 112 to turn the first switching element 111 and the second switching element 112 on/off, to thereby control an electric current flowing through each of the first winding 21 and the second winding 22. When the first switching element 111 is turned on, an electric current is allowed to flow through the first winding 21, and the first inductor core 41 corresponding to the first winding 21 stores the magnetic flux generated from the first winding 21 as the magnetic energy. When the first switching element 111 is turned off, the magnetic energy stored in the first inductor core 41 is discharged, with the result that an electric current is allowed to flow through the capacitor 131 to charge the capacitor 131. Operation performed when the second switching element 112 is turned on/off is similar to the operation performed when the first switching element 111 is turned on/off, and hence a description thereof is omitted. When the first switching element 111 and the second switching element 112 are turned on/off, an output voltage Vo obtained by boosting the input voltage Vi is generated between the both ends of the capacitor 131.

The controller 141 controls the first switching element 111 and the second switching element 112 to alternately turn the first switching element 111 and the second switching element 112 on. In other words, the controller 141 controls the first switching element 111 and the second switching element 112 so that a phase of a ripple current flowing through the first winding 21 and a phase of a ripple current flowing through the second winding 22 are shifted by 180° from each other.

The first winding 21 and the second winding 22 wound around the coupling core 3 are configured so that the winding directions thereof are opposite to each other. Therefore, direct current magnetic fluxes (direct current components of the magnetic fluxes) generated in the closed magnetic circuit of the coupling core 3 by the first winding 21 and direct current magnetic fluxes generated in the closed magnetic circuit of the coupling core 3 by the second winding 22 are in directions opposite to each other to cancel each other. In other words, in the power supply circuit 100 according to this embodiment, the reactor 1 functions as a magnetism canceling reactor.

In the power supply circuit 100 according to this embodiment, the capacitor 131 is repeatedly charged and discharged at a period that is twice a switching period of the first switching element 111 and the second switching element 112. As a result, the capacitor 131 can be downsized.

(2) Details

Figure 3:
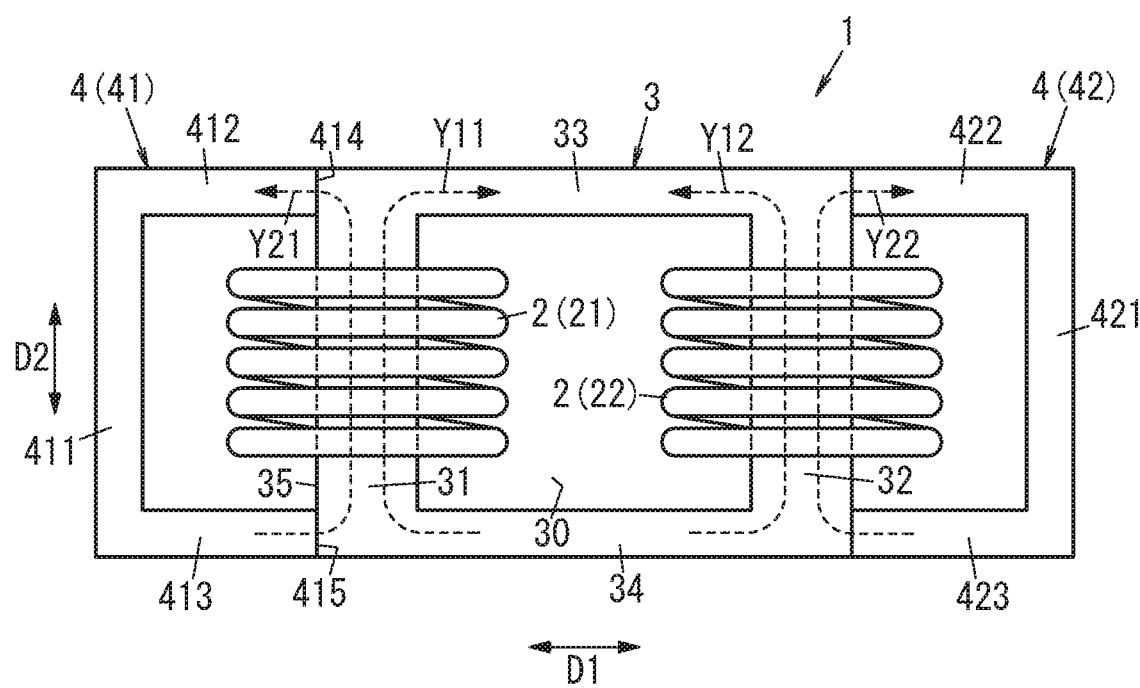
FIG. 3 is a front view of the above-mentioned reactor.

Now, a detailed configuration of the reactor 1 according to this embodiment is described with reference to FIG. 1 and FIG. 3. In FIG. 3, a configuration of the windings 2 (first winding 21 and second winding 22) is schematically illustrated.

The reactor 1 according to this embodiment includes the two windings 2 (first winding 21 and second winding 22), the coupling core 3, and the two inductor cores 4 (first inductor core 41 and second inductor core 42).

The coupling core 3 has a substantially rectangular external shape when viewed from the front, and is formed into a frame shape having a through-hole 30 having a substantially rectangular aperture shape. The coupling core 3 includes a first shaft part 31 and a second shaft part 32, which are opposed to each other in a first direction D1, and a first connection part 33 and a second connection part 34, which are opposed to each other in a second direction D2, which is orthogonal to the first direction D1. The through-hole 30 is formed to pierce the coupling core 3 in a third direction D3, which is orthogonal to the first direction D1 and the second direction D2.

Each of the first shaft part 31 and the second shaft part 32 is formed into a square column shape along the second direction D2. The first winding 21 is wound around the first shaft part 31. The second winding 22 is wound around the second shaft part 32. Each of the first connection part 33 and the second connection part 34 is formed into a square column shape along the first direction D1. The first connection part 33 is formed to connect one end portions (in FIG. 3, upper end portions) of the first shaft part 31 and the second shaft part 32 in the second direction D2 to each other. The second connection part 34 is formed to connect the other end portions (in FIG. 3, lower end portions) of the first shaft part 31 and the second shaft part 32 in the second direction D2 to each other.

The coupling core 3 forms a coupling closed magnetic circuit by the first shaft part 31, the second shaft part 32, the first connection part 33, and the second connection part 34 to magnetically couple the first winding 21 and the second winding 22.

The first winding 21 is a conductive wire (coil) wound around the first shaft part 31 with the first shaft part 31 as an axis. The second winding 22 is a conductive wire (coil) wound around the second shaft part 32 with the second shaft part 32 as an axis. Each of the first winding 21 and the second winding 22 is wound into a square tube shape to be a substantially square frame when viewed from an axis direction (second direction D2) thereof. The number of turns of the first winding 21 and the number of turns of the second winding 22 are the same. The number of turns of each of the first winding 21 and the second winding 22 may be changed as appropriate depending on design and other factors.

As illustrated in FIG. 1, the first winding 21 has a pair of end portions 211 and 212 extracted from one side (in FIG. 1, lower side) in the second direction D2. The second winding 22 has a pair of end portions 221 and 222 extracted from one side (in FIG. 1, lower side) in the second direction D2. The first winding 21 and the second winding 22 have similar configurations. The winding directions of the first winding 21 and the second winding 22 are determined by a connection relationship with a component to which the first winding 21 and the second winding 22 are electrically connected. In this embodiment, of the pair of end portions 211 and 212, the first winding 21 has one end portion 211 electrically connected to the high-potential side input terminal 151, and the other end portion 212 electrically connected to a node between the first switching element 111 and the first diode 121 (see FIG. 2). Further, of the pair of end portions 221 and 222, the second winding 22 has one end portion 221 electrically connected to a node between the second switching element 112 and the second diode 122, and the other end portion 222 electrically connected to the high-potential side input terminal 151 (see FIG. 2). As a result, the winding directions of the first winding 21 and the second winding 22 are opposite to each other. In other words, a direction of the electric current flowing through the first winding 21 and a direction of the electric current flowing through the second winding 22 are opposite to each other with respect to the coupling core 3. Therefore, in the coupling closed magnetic circuit formed by the coupling core 3, the direct current magnetic flux generated by the first winding 21 and the direct current magnetic flux generated by the second winding 22 are opposite to each other to cancel each other. In FIG. 3, in the coupling closed magnetic circuit, a direction of the direct current magnetic flux generated by the first winding 21 is conceptually indicated by a broken-line arrow Y11, and a direction of the direct current magnetic flux generated by the second winding 22 is conceptually indicated by a broken-line arrow Y12. In FIG. 3, the directions of the direct current magnetic fluxes generated by the first winding 21 and the second winding 22, which are indicated by the broken-line arrows Y11 and Y12, are merely one example, and may be opposite directions.

In order to reduce a magnetic resistance between the first winding 21 and the second winding 22, it is preferred that the coupling core 3 be formed to have a higher magnetic permeability. Meanwhile, in the reactor 1 according to this embodiment, the coupling closed magnetic circuit formed by the coupling core 3 is configured so that the direct current magnetic flux generated by the first winding 21 and the direct current magnetic flux generated by the second winding 22 cancel each other, and hence a saturation magnetic flux density of the coupling core 3 may be low. Therefore, the coupling core 3 in this embodiment is formed of a ferrite containing manganese zinc (Mn—Zn) or nickel zinc (Ni—Zn) as a material, for example.

The inductor cores 4 are arranged side by side with the coupling core 3 in the first direction D1. The two inductor cores 4 correspond to the two windings 2 in a one-on-one relationship. Specifically, the first inductor core 41 corresponds to the first winding 21 wound around the first shaft part 31 of the coupling core 3. The first inductor core 41 is arranged on the first shaft part 31 side (in FIG. 3, left side) of the coupling core 3 in the first direction D1, and forms an inductor closed magnetic circuit (first inductor closed magnetic circuit) together with the first shaft part 31. The second inductor core 42 corresponds to the second winding 22 wound around the second shaft part 32 of the coupling core 3. The second inductor core 42 is arranged on the second shaft part 32 side (in FIG. 3, right side) of the coupling core 3 in the first direction D1, and forms an inductor closed magnetic circuit (second inductor closed magnetic circuit) together with the second shaft part 32.

The first inductor core 41 has a substantially C outer shape when viewed from the front, and has dimensions in the second direction D2 and the third direction D3 that are substantially the same as dimensions of the coupling core 3 in the second direction D2 and the third direction D3 respectively. The first inductor core 41 includes a main part 411, a first projection part 412, and a second projection part 413.

The main part 411 is formed into a square column shape along the second direction D2, and is separated from the first shaft part 31 to one side (in FIG. 3, left side) in the first direction D1.

The first projection part 412 and the second projection part 413 are formed to project from both end portions of the main part 411 in the second direction D2 toward the coupling core 3. The first projection part 412 is formed to project from one end portion (in FIG. 3, upper end portion) of the main part 411 in the second direction D2 toward the coupling core 3. The first projection part 412 is formed into a square column shape along the first direction D1, and has a distal end surface 414 (in FIG. 3, right end surface) opposed to one surface 35 (in FIG. 3, left surface) of the coupling core 3 that is orthogonal to the first direction D1. The second projection part 413 is formed to project from the other end portion (in FIG. 3, lower end portion) of the main part 411 in the second direction D2 toward the coupling core 3. The second projection part 413 is formed into a square column shape along the first direction D1, and has a distal end surface 415 (in FIG. 3, right end surface) opposed to the one surface 35 of the coupling core 3 that is orthogonal to the first direction D1.

The first inductor core 41 forms the first inductor closed magnetic circuit together with the part of the coupling core 3 around which the first winding 21 is wound. Specifically, the main part 411, the first projection part 412, and the second projection part 413 of the first inductor core 41 and the first shaft part 31 of the coupling core 3 form the first inductor closed magnetic circuit, through which the magnetic flux generated by the first winding 21 passes. The first shaft part 31 of the coupling core 3 doubles as the coupling closed magnetic circuit and the first inductor closed magnetic circuit. In FIG. 3, in the first inductor closed magnetic circuit, a direction of the direct current magnetic flux generated by the first winding 21 is conceptually indicated by a broken-line arrow Y21.

In the first inductor closed magnetic circuit, a gap between the distal end surface 414 of the first projection part 412 and the one surface 35 of the coupling core 3, and a gap between the distal end surface 415 of the second projection part 413 and the one surface 35 of the coupling core 3 form magnetic gaps. In this embodiment, the first inductor core 41 is arranged so that the distal end surfaces 414 and 415 of the first projection part 412 and the second projection part 413 are proximate to the one surface 35 of the coupling core 3. The first inductor core 41 and the coupling core 3 may be bonded to each other with an adhesive, for example.

The first inductor core 41 is configured to store, as the magnetic energy, the magnetic flux generated from the first winding 21. The direct current magnetic flux generated in the first inductor core 41 by the first winding 21 is not canceled. Therefore, it is preferred that the first inductor core 41 be formed to have a higher saturation magnetic flux density. Meanwhile, the first inductor core 41 may have a low magnetic permeability. Therefore, the first inductor core 41 in this embodiment is formed of a dust core containing, as a material, iron silicon aluminum (Fe—Si—Al), iron nickel (Fe—Ni), iron silicon (Fe—Si), or other alloys, for example.

As described above, in the reactor 1 according to this embodiment, the coupling core 3 is formed of the ferrite, and the first inductor core 41 is formed of the dust core. When the coupling core 3 and the first inductor core 41 are compared with each other, the coupling core 3 has a magnetic permeability that is higher than that of the first inductor core 41. Further, when the coupling core 3 and the first inductor core 41 are compared with each other, the material forming the first inductor core 41 has a saturation magnetic flux density that is higher than that forming the coupling core 3. The magnetic flux density and a magnitude of an inductance of the first inductor core 41 can also be adjusted by a size of a cross-sectional area of the first inductor core 41.

The second inductor core 42 includes a main part 421, a first projection part 422, and a second projection part 423, and is arranged on a side (in FIG. 3, right side) of the coupling core 3 that is opposite to the first inductor core 41. The second inductor core 42 has a configuration that is similar to that of the first inductor core 41, and hence a detailed description thereof is omitted.

The second inductor core 42 forms the second inductor closed magnetic circuit together with the part of the coupling core 3 around which the second winding 22 is wound. Specifically, the main part 421, the first projection part 422, and the second projection part 423 of the second inductor core 42 and the second shaft part 32 of the coupling core 3 form the second inductor closed magnetic circuit, through which the magnetic flux generated by the second winding 22 passes. The second shaft part 32 of the coupling core 3 doubles as the coupling closed magnetic circuit and the second inductor closed magnetic circuit. In FIG. 3, in the second inductor closed magnetic circuit, a direction of the direct current magnetic flux generated by the second winding 22 is conceptually indicated by a broken-line arrow Y22.

(3) Advantages

Next, advantages of the reactor 1 according to this embodiment are described. First, reactors according to a first comparative example and a second comparative example, which are used for comparison with the reactor 1 according to this embodiment, are described.

The reactor according to the first comparative example is different from the reactor 1 according to this embodiment in that a coupling core and inductor cores, each of which is formed into a rectangular frame shape, are arranged side by side, and in that the windings are wound around both of shaft parts of the coupling core and shaft parts of the inductor cores in an integrated manner. In order to prevent magnetic fields generated in a coupling core and inductor cores from affecting each other, the reactor according to the second comparative example further includes, in addition to the configuration of the reactor according to the first comparative example, magnetic insulation members provided between the coupling core and the inductor cores.

In the reactor according to the first comparative example, the windings are wound around both of the coupling core and the inductor cores. Therefore, in the reactor according to the first comparative example, of the coupling core and the inductor cores, the magnetic fluxes generated by the windings are concentrated in a coupling core that has a higher magnetic permeability. In the reactor according to the second comparative example, with the magnetic insulation members inserted between the coupling core and the inductor cores, a difference between a magnetic flux density of a magnetic flux generated in the coupling core by the windings and a magnetic flux density of a magnetic flux generated in each of the inductor cores by the windings is reduced.

In the reactor 1 according to this embodiment, the windings 2 are wound only around the coupling core 3 among the coupling core 3 and the inductor cores 4. Therefore, in the reactor 1 according to this embodiment, the magnetic insulation members (magnetic insulation sheets) of the reactor in the second comparative example are not required, and hence downsizing can be achieved. Further, in the reactor according to the second comparative example, magnetic fluxes (leakage magnetic fluxes) are concentrated in the magnetic insulation members, and there is a possibility that the leakage magnetic fluxes link to the windings to increase an eddy current loss. The reactor 1 according to this embodiment does not include the magnetic insulation members, and hence the leakage magnetic fluxes are not generated, with the result that the eddy current loss of the windings 2 can be reduced.

MODIFICATION EXAMPLE

Next, a modification example of the reactor 1 according to this embodiment is described. In the following description, components common to those of the reactor 1 described above are denoted by the same reference symbols, and a description thereof is omitted.

The number of windings 2 is not limited to two, and may be a plurality, for example, three or more. Further, the number of inductor cores 4 is not limited to two, and may be a plurality, for example, three or more. Further, for example, in a power supply circuit including a reactor including three windings, it is preferred that a controller configured to control electric currents flowing through the three windings be configured to shift phases of ripple currents flowing through the three windings such that the phases become different from each other by 120°.

Figure 4:
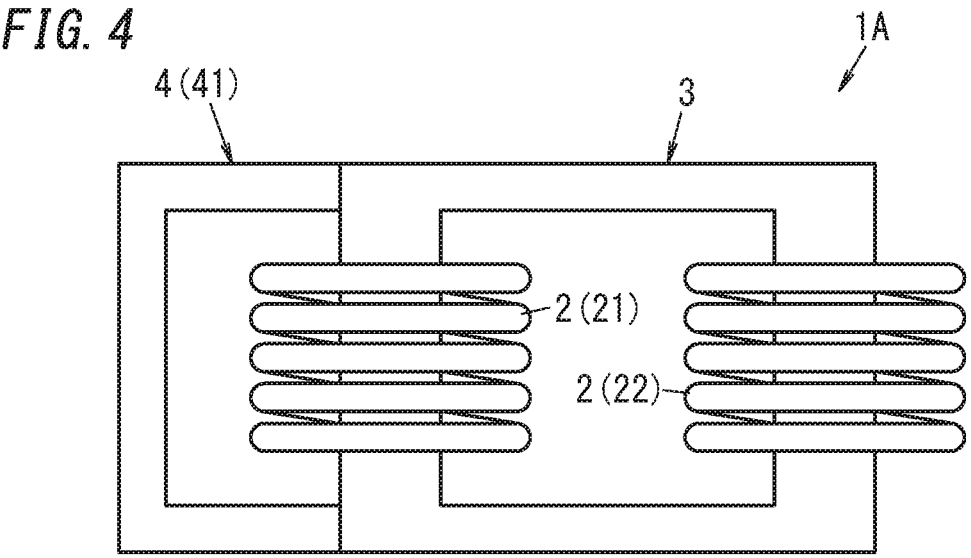
FIG. 4 is a front view of a reactor according to a modification example of the embodiment of the present disclosure.
Figure 5:
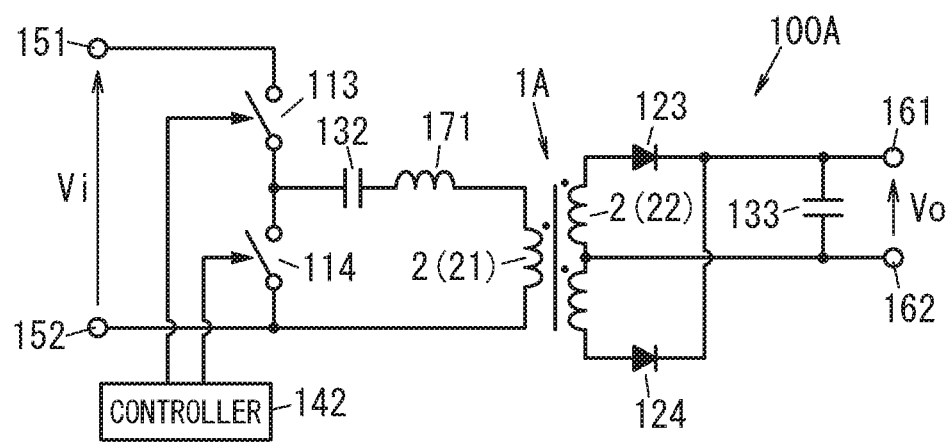
FIG. 5 is a circuit diagram of a power supply circuit including the above-mentioned reactor.

In the reactor 1 described above, the number of windings 2 and the number of inductor cores 4 are the same, but the number of windings 2 and the number of inductor cores 4 may be different numbers. Further, the configuration of the power supply circuit 100 including the reactor 1 is not limited to the multi-phase boost chopper circuit (see FIG. 2). FIG. 4 is a front view of a reactor 1A according to a modification example. FIG. 5 is an equivalent circuit diagram of a power supply circuit 100A including the reactor 1A according to the modification example.

The reactor 1A includes two windings 2 (first winding 21 and second winding 22), a coupling core 3, and one inductor core 4 (first inductor core 41). In other words, the reactor 1A has a configuration in which the second inductor core 42 is omitted from the reactor 1 (see FIG. 1 and FIG. 3) described above.

The power supply circuit 100A is an LLC current resonant converter circuit including the reactor 1A and a controller 142. The power supply circuit 100A further includes a first switching element 113, a second switching element 114, a first diode 123, a second diode 124, a first capacitor 132, and a second capacitor 133.

Between the pair of input terminals 151 and 152, between which an input voltage Vi is applied, a series circuit of the first switching element 113 and the second switching element 114 is electrically connected. Each of the first switching element 113 and the second switching element 114 is formed of a MOSFET, for example, and is controlled to be turned on/off by the controller 142. Between both ends of the second switching element 114, a series circuit of the first capacitor 132 and the first winding 21 of the reactor 1A is electrically connected. Further, the reference numeral "171" in FIG. 5 indicates a leakage inductance of the reactor 1A. A magnitude of the leakage inductance 171 can be adjusted by a size of a cross-sectional area of the first inductor core 41 of the reactor 1A, for example. In the power supply circuit 100A, the leakage inductance 171 functions as a resonant inductor. The first capacitor 132 is a resonant capacitor.

The reactor 1A has a center tap provided in the second winding 22. Between one end of the second winding 22 and the center tap, a series circuit of the first diode 123 and the second capacitor 133 is electrically connected, and between the other end of the second winding 22 and the center tap, a series circuit of the second diode 124 and the second capacitor 133 is electrically connected. The second capacitor 133 is a smoothing capacitor, and is electrically connected between a pair of output terminals 161 and 162. The first diode 123 has an anode electrically connected to the one end of the second winding 22, and a cathode electrically connected to the second capacitor 133. The second diode 124 has an anode electrically connected to the other end of the second winding 22, and a cathode electrically connected to the second capacitor 133.

The controller 142 controls the first switching element 113 and the second switching element 114 to turn the first switching element 113 and the second switching element 114 on/off to control an electric current flowing through each of the first winding 21 and the second winding 22. The controller 142 controls the first switching element 113 and the second switching element 114 to alternately turn the first switching element 113 and the second switching element 114 on. As a result, the output voltage Vo is generated between both ends of the second capacitor 133.

Now, another modification example of the reactor 1 is described.

The reactor 1 may have a configuration in which two windings 2, a coupling core 3, and two inductor cores 4 are integrally sealed by a resin or other sealing members. As a result, winding displacement of the windings 2 can be suppressed.

Further, the reactor 1 may have a configuration including a bobbin. The bobbin is provided so that the windings 2 are wound therearound and shaft parts (first shaft part 31 and second shaft part 32) of the coupling core 3 pass therethrough.

Moreover, the reactor 1 is not limited to the configuration in which each of the coupling core 3 and the inductor cores 4 is integrally formed, but may have a configuration in which each of the coupling core 3 and the inductor cores 4 is divided into a plurality. For example, the reactor 1 may have a configuration in which each of the coupling core 3 and the inductor cores 4 is divided in two in the second direction D2.

Further, in the reactor 1, the coupling core 3 and the inductor cores 4 may be formed of the same material. In this case, the coupling core 3 and the inductor cores 4 may be integrally formed.

(4) Summary

A reactor (1, 1A) according to the first aspect of the present disclosure includes a plurality of windings (2, 21, 22), a coupling core (3, 3A), and an inductor core (4, 41, 42). A coupling core (3, 3A) is configured to form a coupling closed magnetic circuit that magnetically couples the plurality of windings (2, 21, 22), the plurality of windings (2, 21, 22) being wound around the coupling core (3, 3A). An inductor core (4, 41, 42), which includes a main part (411, 421), a first projection part (412, 422) projecting from one end of the main part (411, 421), and a second projection part (413, 423) projecting from another end of the main part (411, 421), and each of the first projection part (412, 422) and the second projection part (413, 423) is magnetically connected to the coupling core (3, 3A). The inductor core (4, 41, 42) forms an inductor closed magnetic circuit together with a part of the coupling core (3, 3A) around which one winding (2, 21, 22) of the plurality of windings (2, 21, 22) is wound.

According to this configuration, the windings (2, 21 and 22) are wound only around the coupling core (3, 3A) among the coupling core (3, 3A) and the inductor cores (4, 41 and 42), and hence the reactor (1, 1A) can be downsized.

The reactor (1) according to the second aspect, in the first aspect, includes a plurality of the inductor cores (4, 41 and 42), and the number of the plurality of windings (2, 21 and 22) and the number of the plurality of the inductor cores (4, 41 and 42) are the same.

According to this configuration, the inductor function of storing the magnetic flux generated by each of the plurality of windings (2, 21 and 22) as the magnetic energy can be achieved.

In the reactor (1) according to a third aspect, in the second aspect, each of the number of the plurality of windings (2, 21 and 22) and the number of the plurality of the inductor cores (4, 41 and 42) is two.

According to this configuration, the two-phase magnetic coupling reactor can be achieved.

In the reactor (1) according to a fourth aspect, in the third aspect, the two windings (2, 21 and 22) have the same number of turns.

According to this configuration, the coupling closed magnetic circuit may be configured so that the direct current magnetic fluxes generated by the two windings (2, 21 and 22) cancel each other, and the coupling core (3) can be downsized.

In the reactor (1, 1A) according to a fifth aspect, in any one of the first to fourth aspects, the coupling core (3, 3A) has a magnetic permeability that is higher than a magnetic permeability of the inductor core (4, 41 and 42).

According to this configuration, the magnetic resistance between the plurality of windings (2, 21 and 22) can be reduced.

In the reactor (1, 1A) according to a sixth aspect, in any one of the first to fifth aspects, the coupling core (3, 3A) and the inductor core (4, 41 and 42) are formed of different materials. The inductor core (4, 41 and 42) has a saturation magnetic flux density that is higher than a saturation magnetic flux density of the coupling core (3, 3A).

According to this configuration, the inductor core (4, 41 and 42) can be downsized.

A power supply circuit (100, 100A) according to a seventh aspect of the present disclosure includes the reactor (1, 1A) of any one of the first to sixth aspects, and a controller (141, 142). The controller (141, 142) is configured to control electric currents flowing through the plurality of windings (2, 21 and 22).

According to this configuration, the power supply circuit (100, 100A) including the reactor (1, 1A) can be downsized.

In the power supply circuit (100, 100A) according to an eighth aspect, in the seventh aspect, the controller (141, 142) shifts phases of ripple currents flowing through the plurality of windings (2, 21 and 22), the phases of ripple currents shifted being different from each other.

According to this configuration, magnetic saturation of the coupling core (3, 3A) can be suppressed.

REFERENCE SIGNS LIST 1, 1A reactor
2 winding
3, 3A coupling core
4 inductor core
411, 421 main part
412, 422 first projection part
413, 423 second projection part
100, 100A power supply circuit
141, 142 controller

The invention claimed is:

1. A reactor, comprising:
a plurality of windings;
a coupling core configured to form a coupling closed magnetic circuit that magnetically couples the plurality of windings, the plurality of windings being wound around the coupling core; and
a plurality of inductor cores, each of which includes a main part, a first projection part projecting from one end of the main part, and a second projection part projecting from another end of the main part, each of the first projection part and the second projection part being magnetically connected to the coupling core,
each of the plurality of inductor cores forming an inductor closed magnetic circuit together with a part of the coupling core around which one winding of the plurality of windings is wound,
wherein the number of the plurality of windings and the number of the plurality of inductor cores are the same,
the plurality of inductor cores correspond one to one to the plurality of windings,
the main part of each of the plurality of inductor cores is opposed to the corresponding winding among the plurality of windings, and
the coupling core has a magnetic permeability that is higher than a magnetic permeability of each of the plurality of inductor cores.

2. A reactor, comprising:
a plurality of windings;
a coupling core configured to form a coupling closed magnetic circuit that magnetically couples the plurality of windings, the plurality of windings being wound around the coupling core; and
a plurality of inductor cores, each of which includes a main part, a first projection part projecting from one end of the main part, and a second projection part projecting from another end of the main part, each of the first projection part and the second projection part being magnetically connected to the coupling core,
each of the plurality of inductor cores forming an inductor closed magnetic circuit together with a part of the coupling core around which one winding of the plurality of windings is wound,
wherein the number of the plurality of windings and the number of the plurality of inductor cores are the same,
the plurality of inductor cores correspond one to one to the plurality of windings, the main part of each of the plurality of inductor cores is opposed to the corresponding winding among the plurality of windings,
the coupling core is formed of a material different from a material which the plurality of inductor cores are formed of, and
wherein each of the plurality of inductor cores has a saturation magnetic flux density that is higher than a saturation magnetic flux density of the coupling core.

3. The reactor according to claim 1, wherein each of the number of the plurality of windings and the number of the plurality of inductor cores is two.

4. The reactor according to claim 3, wherein the two windings have the same number of turns.

5. The reactor according to claim 2, wherein the coupling core has a magnetic permeability that is higher than a magnetic permeability of each of the plurality of inductor cores.

6. The reactor according claim 3,
wherein the coupling core is formed of a material different from a material which the plurality of inductor cores are formed of, and
wherein each of the plurality of inductor cores has a saturation magnetic flux density that is higher than a saturation magnetic flux density of the coupling core.

7. A power supply circuit, comprising:
the reactor of claim 1; and
a controller configured to control electric currents flowing through the plurality of windings.

8. The power supply circuit according to claim 7, wherein the controller shifts phases of ripple currents flowing through the plurality of windings, the phases of ripple currents shifted being different from each other.

9. The reactor according to claim 4,
wherein the coupling core is formed of a material different from a material which the plurality of inductor cores are formed of, and
wherein each of the plurality of inductor cores has a saturation magnetic flux density that is higher than a saturation magnetic flux density of the coupling core.

10. The reactor according to claim 2, wherein each of the number of the plurality of windings and the number of the plurality of inductor cores is two.

11. The reactor according to claim 10, wherein the two windings have the same number of turns.

\* \* \* \* \*